United States Patent
Baumgarten et al.

[11] Patent Number: 6,068,350
[45] Date of Patent: May 30, 2000

[54] UNIVERSAL VEHICLE WHEEL

[75] Inventors: John M. Baumgarten, Novi; Khosrow Namdariam, Lincoln Park; Carroll D. Moore, Westland; Jeffery F. Beam, Romulus, all of Mich.

[73] Assignee: Hayes Lemmerz International, Inc., Northville, Mich.

[21] Appl. No.: 09/318,901

[22] Filed: May 26, 1999

Related U.S. Application Data

[63] Continuation of application No. PCT/US97/21891, Nov. 26, 1997.
[60] Provisional application No. 60/031,784, Nov. 26, 1996.

[51] Int. Cl.[7] .................................................. B60B 3/10
[52] U.S. Cl. .......................... 301/64.1; 301/37.1; 301/65; 29/894.32
[58] Field of Search ................ 301/37.1, 37.43, 301/37.42, 63.1, 64.2, 64.3, 65; 29/894.32, 894.324, 894.34

[56] References Cited

U.S. PATENT DOCUMENTS

| | | |
|---|---|---|
| 3,263,315 | 8/1966 | O'Brien . |
| 3,726,566 | 4/1973 | Beith ................................... 301/63.1 X |
| 4,067,600 | 1/1978 | Knorr et al. ........................ 301/64.3 X |
| 4,105,255 | 8/1978 | Kopp ..................................... 301/65 X |
| 4,316,637 | 2/1982 | Reynolds et al. . |
| 4,344,654 | 8/1982 | Apezynski . |
| 4,530,542 | 7/1985 | Spiegel et al. ......................... 301/37.1 |
| 4,645,268 | 2/1987 | Carlson ................................. 301/65 X |
| 5,031,966 | 7/1991 | Oakey ................................ 301/64.1 X |
| 5,096,263 | 3/1992 | Wright ................................ 301/37.37 |
| 5,292,182 | 3/1994 | Kanazawa ................................. 301/65 |
| 5,368,370 | 11/1994 | Beam . |
| 5,427,171 | 6/1995 | Prieto . |
| 5,458,401 | 10/1995 | Baccman . |
| 5,577,809 | 11/1996 | Chase . |
| 5,595,423 | 1/1997 | Heck et al. .......................... 301/37.43 |
| 5,597,213 | 1/1997 | Chase . |
| 5,636,906 | 6/1997 | Chase . |
| 5,651,590 | 7/1997 | Word . |

FOREIGN PATENT DOCUMENTS

| | | |
|---|---|---|
| 0475915 A1 | 3/1992 | European Pat. Off. . |
| 53-69302 | 6/1978 | Japan ................................... 301/37.43 |
| 63-038001 | 2/1988 | Japan . |
| 63-258202 | 10/1988 | Japan . |
| 63-315302 | 12/1988 | Japan . |
| 2109317 | 6/1983 | United Kingdom . |
| WO 94/22679 | 10/1994 | WIPO . |

*Primary Examiner*—Russell D. Stormer
*Attorney, Agent, or Firm*—MacMillan, Sobanski & Todd, LLC

[57] ABSTRACT

A vehicle wheel assembly having a stylized outer wheel disc permanently attached to a universal base wheel. The universal base wheel can be utilized on a plurality of vehicle platforms. The structure of the base wheel is designed for optimal strength and minimum weight to structurally support the weight of a vehicle. The outer wheel disc provides a pleasing aesthetic appearance and provides no structural support to the vehicle.

26 Claims, 5 Drawing Sheets

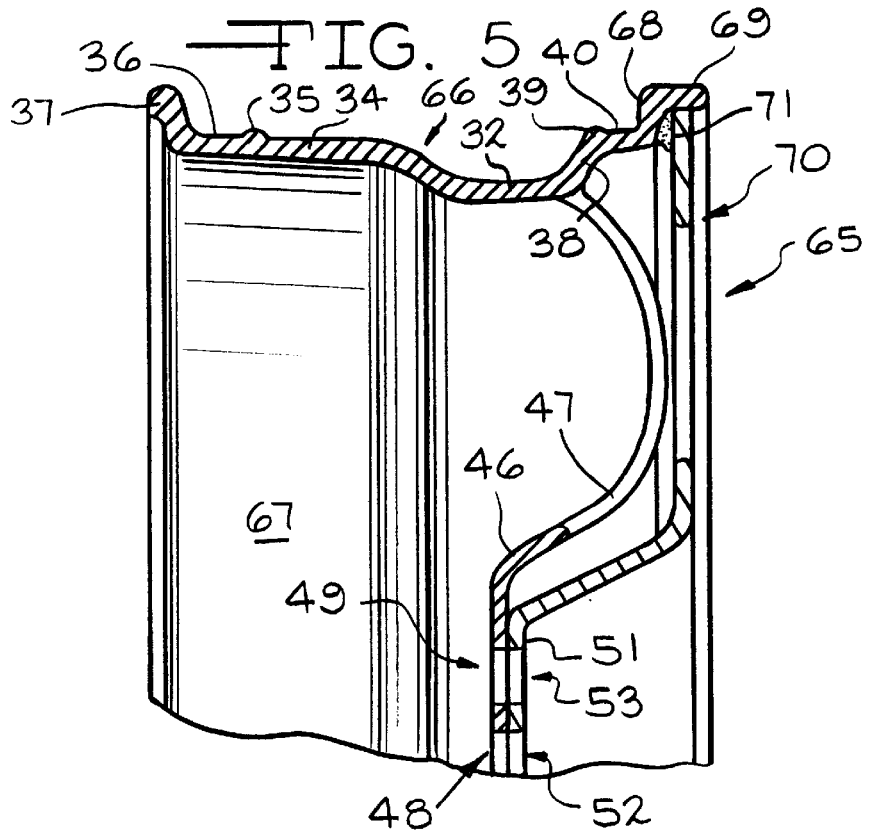
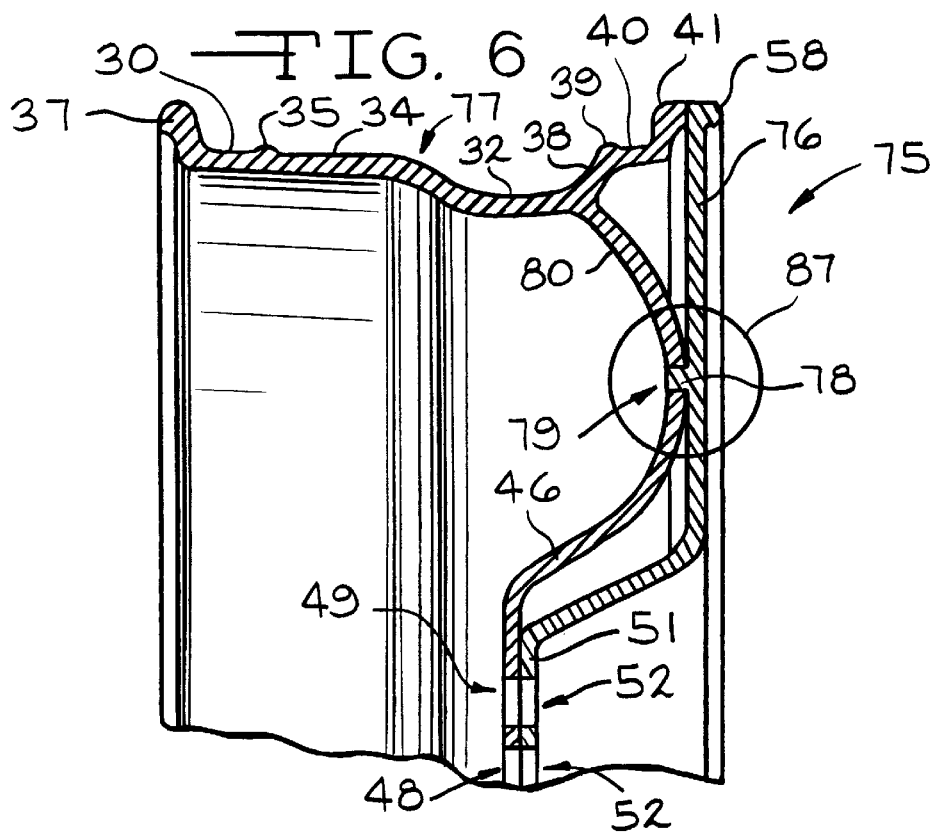

UNIVERSAL VEHICLE WHEEL

CROSS REFERENCE TO RELATED APPLICATIONS

This application claims the benefit of U.S. Provisional Application No. 60/031,784, which was filed on Nov. 26, 1996.

This application is a continuation of PCT/US97/21891, which was filed Nov. 26, 1997.

BACKGROUND OF THE INVENTION

This invention relates in general to light weight vehicle wheels and in particular to a light weight wheel assembly which includes a stylized wheel disc mounted upon a universal one piece cast wheel and a process for manufacturing the wheel assembly.

Cast vehicle wheels formed from alloys of light metals, such as aluminum, magnesium and titanium have become increasingly popular. Such cast wheels provide both a reduction in weight from steel wheels and can be cast having an attractive stylized appearance.

Referring now to the drawings, there is illustrated in FIG. 1 a perspective view of a typical one piece cast vehicle wheel, shown generally at 10, which is formed in accordance with the prior art. The wheel 10 includes an annular wheel rim 11 which is adapted to carry a pneumatic tire (not shown). The rim 10 has an inboard end 12 which is adjacent to a vehicle (not shown) when the wheel 10 is mounted thereon and an outboard end 13 which is opposite from the inboard end 12. The wheel 10 further includes a circular wheel disc 15 which extends radially across the outboard end 13 of the wheel rim 11. The wheel disc 15 includes an annular sidewall 17 formed on the outboard end of the wheel rim 11. A plurality of radially extending wheel spokes 18 support a central wheel hub 20 within the sidewall 17. The hub 20 includes a recessed center portion 21 having a central pilot hole 22 formed therethrough. The center portion also has a plurality of apertures 23 formed therethrough. The apertures 23 are spaced equally about a bolt circle which is concentric with the pilot hole 22. When the wheel 10 is mounted upon a vehicle, each of the apertures 23 receives a threaded wheel lug (not shown) for securing the wheel 10 upon the vehicle.

Components of molds used to cast such one piece wheels typically include a mold cavity having tapered surfaces to facilitate release of the wheel casting. The tapered surfaces cause the sidewall 17 to be relatively thick. Additionally, the mold structure usually requires the rim portion of the mold cavity to have a wide spacing in the radial direction. This allows molten metal to flow from risers located at the inboard end of the wheel mold cavity through the rim portion of the cavity to fill voids formed as the molten metal forming the casting sidewall 17 contracts during solidification. The wide rim cavity results in a relatively thick wheel rim.

It is known to decorate the outboard face of the wheel disc 15 by polishing the surface to a high luster and then sealing the surface with a layer of clear coat. Alternately, the wheel disc face can be painted or plated with a metal, such as chromium. Chrome plating typically requires sequential immersion of the wheel in a series of chemical baths while multiple layers of metal are electro-deposited onto the surface of the wheel. Because of the complexity of the plating process, it also is known to apply a decorative chrome plated overlay to the face of the wheel disc, as disclosed in U.S. Pat. No. 5,597,213 to Chase. Such overlays are typically vacuum formed from a plastic.

SUMMARY OF THE INVENTION

This invention relates to a light weight wheel assembly which includes a stylized wheel disc mounted upon a universal one piece cast wheel and a process for manufacturing the wheel assembly.

As described above, the wheel casting process results in one piece cast wheels typically having relatively thick sidewalls and rims. This increases the weight of the wheel and, because more metal is required to cast a wheel, the cost of the wheel. It is known to form lightener pockets in the sidewall to reduce wheel weight. However, forming lightener pockets typically requires complex wheel molds, an example of which is disclosed in U.S. Pat. No. 5,427,171 to Prieto, or expensive machining of the wheel casting. Thus, it would be desirable to reduce the amount of metal in the wheel sidewall and rim to reduce the wheel weight and cost The stylized nature of wheel designs often requires a compromise between the design of the wheel face and the requirements for the mechanical structure of the wheel. Typically, vehicle manufacturers will require differently styled wheels for different vehicle lines and for different trim levels offered as options for each individual vehicle line. Accordingly, the need to provide many different stylized wheel faces requires a corresponding large number of stylized wheel molds which are used for limited production runs of each of the wheels. Each of these stylized wheel molds incurs tooling costs and requires storage between production runs. Thus, it also would be desirable to reduce the number of molds required for casting the wheels to reduce tooling and storage costs.

The present invention is directed toward a wheel assembly comprising a universal vehicle wheel having an annular rim adapted to carry a pneumatic vehicle tire. The rim has an outboard end and an inboard end. The universal wheel also has a circular wheel disc which is adapted to be mounted on a vehicle formed across the wheel rim. In the preferred embodiment, the universal wheel is cast in one piece.

The wheel assembly further includes a stylized outer wheel disc attached to the outboard end of the wheel rim. The outer wheel disc includes a flange formed on the circumference thereof which extends axially therefrom. The flange provides a mounting surface for retaining wheel balance weights. In the preferred embodiment, the outer wheel disc is die cast and completely covers the outboard end of the universal wheel. The outer wheel disc is permanently attached to the outboard end of the universal wheel rim with an adhesive. Alternately, the wheel disc can be welded to the universal wheel. The present invention contemplates that the universal wheel is adapted to be mounted upon a plurality of different vehicle platforms. Different outer wheel discs which are designed for a specific vehicle platform are attached to the outboard end of the universal wheel to form a wheel assembly for that platform.

It is further contemplated that the outer wheel disc includes a decorative layer of chrome plating. When plated, the plating extends over the balance weight retention flange. Alternately, the outer wheel disc can be polished or decorated with a layer of paint.

The present invention further contemplates a process for manufacturing a vehicle wheel comprising the steps of forming a one piece wheel and machining the wheel to a final shape. While the wheel is being formed, an outer wheel disc is formed. A decorative coating, such as a layer of chrome plating is applied to a surface of the outer wheel disc. The outer wheel disc is then attached to the outboard end of the wheel.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is a partial sectional view of an alternate embodiment of the wheel assembly shown in FIG. 3.

FIG. 6 is a partial sectional view of another alternate embodiment of the wheel assembly shown in FIG. 3.

DETAILED DESCRIPTION OF THE PREFERRED EMBODIMENT

Figure 1:
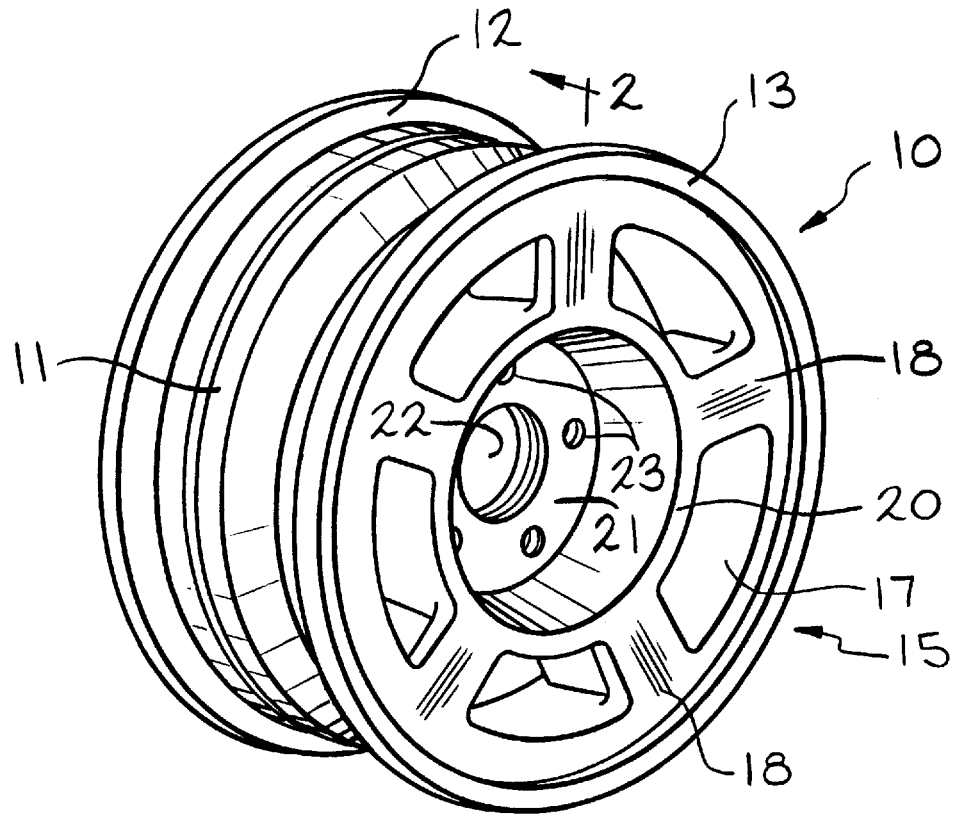
FIG. 1 is perspective view of a one piece vehicle wheel cast in accordance with the prior art.
Figure 2:
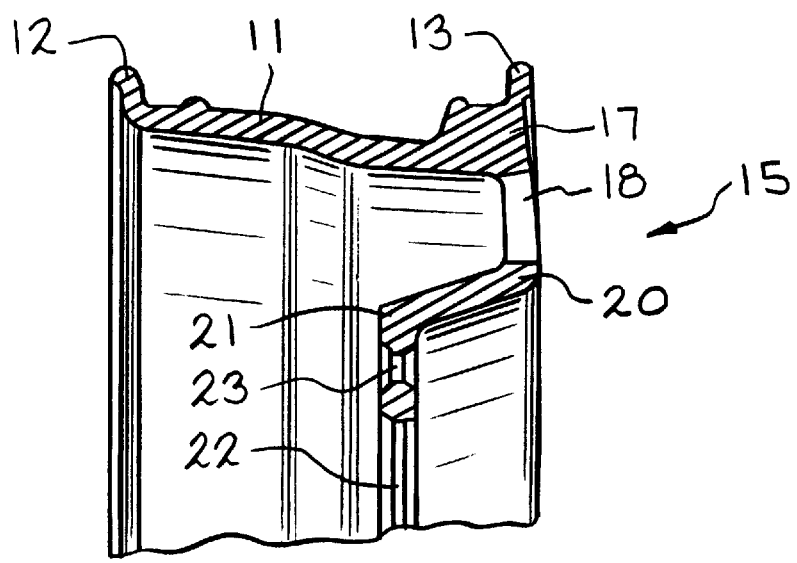
FIG. 2 is a partial sectional view of the vehicle wheel shown in FIG. 1 taken along line 2—2.
Figure 3:
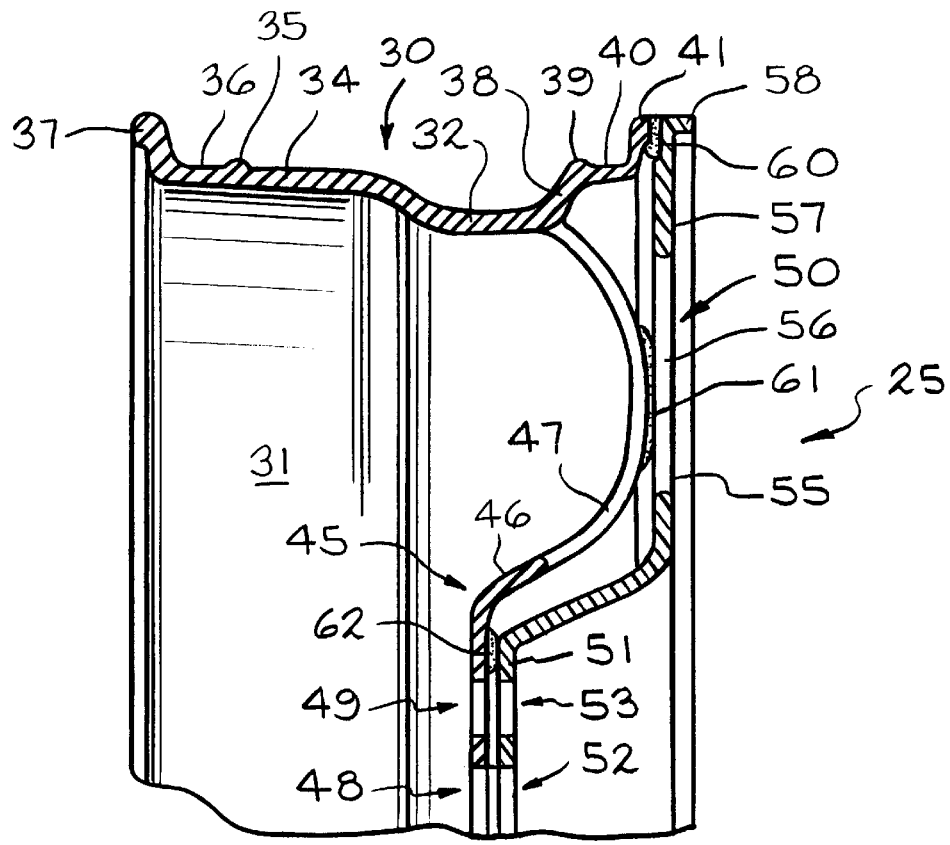
FIG. 3 is a partial sectional view of a vehicle wheel assembly in accordance with the invention.

Referring again to the drawings, there is illustrated in FIG. 3, a partial sectional view of a vehicle wheel assembly 25 in accordance with the present invention. In the preferred embodiment, the wheel assembly 25 includes a one piece "universal" wheel 30 which is cast from an alloy of a light-weight metal, such as, for example, aluminum, magnesium or titanium. While a one piece cast wheel 30 is illustrated, it will be appreciated that the universal wheel also can be cast or fabricated from a stamped wheel disc and a rolled wheel rim. Additionally, while an alloy of a light weight metal is used in the preferred embodiment, the universal wheel also can be formed from steel.

Figure 4:
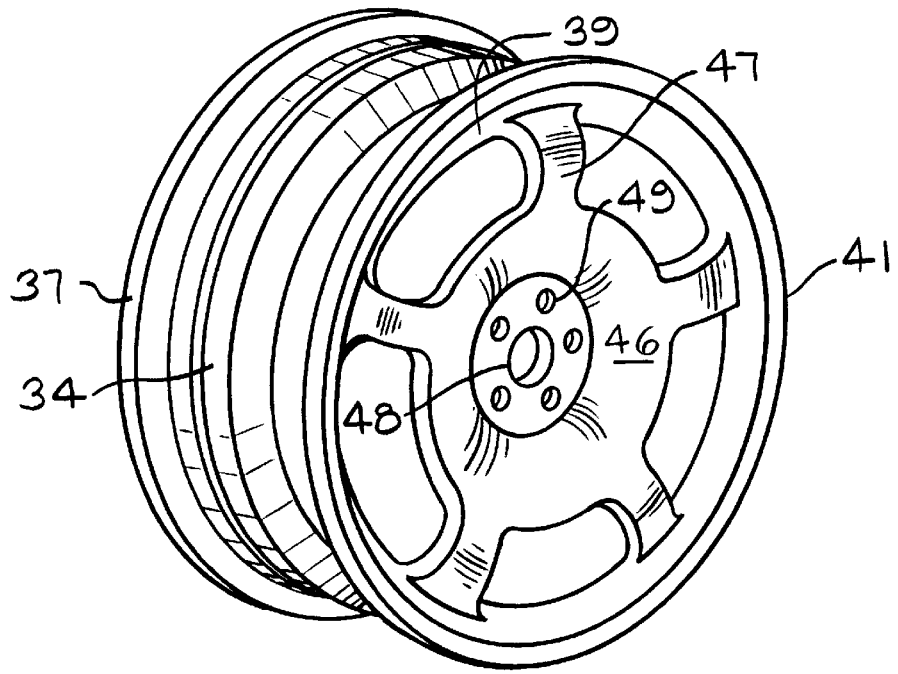
FIG. 4 is a perspective view of a one piece wheel which is included in the wheel assembly shown in FIG. 3.

The universal wheel 30, which is shown in a perspective view in FIG. 4, includes a generally cylindrical wheel rim 31 having a recessed deep well 32. Extending from the deepwell 32 toward the inboard end of the wheel 33, which is to the left in FIG. 3, is a tapered leg portion 34. The leg portion 34 terminates in a circumferential inboard tire safety bead 35. Adjacent to the inboard tire safety bead 35 is an inboard tire bead seat 36 which is adapted to carry an inboard tire wall bead of a pneumatic vehicle tire (not shown). The inboard end of the wheel rim 31 terminates in a radially extending inboard tire retaining flange 37.

The outboard end of the deepwell 32, which is to the right in FIG. 3, is formed as an annular wall 38 which extends in an outward radial direction. The annular wall 38 terminates in an outboard tire safety bead 39. An outboard tire bead seat 40, which is adapted to carry an outboard tire wall bead (not shown) is adjacent to the outboard tire safety bead 39. The outboard end of the wheel rim 31 terminates in a radially extending outboard tire retaining flange 41.

The wheel 30 further includes a circular wheel disc 45 which, in the preferred embodiment, is integrally cast across the outboard end of the wheel rim 31. The wheel disc 45 includes a recessed central wheel hub 46 supported within the wheel rim 31 by a plurality of wheel spokes 47. The wheel spokes 47 extend in a radial arch from the wheel hub 46 to the deepwell annular wall 38. The arcuate shape of the wheel spokes 47 provide space within the wheel 30 for brake hardware. While a recessed wheel hub 46 and arcuate wheel spokes 47 are shown in FIGS. 3 and 4, it will be appreciated that the invention also can be practiced with a flush wheel hub (not shown) and nonarcuate spokes (not shown). A pilot hole 48 is formed through the center of the wheel hub 46 and a plurality of wheel lug holes 49 are formed through the wheel hub 46 equally spaced along a bolt circle which is concentric with the pilot hole 48. The wheel hub 46 and spokes 47 are designed to have sufficient structural strength to support a vehicle.

The wheel assembly 25 also includes a decorative outer wheel disc 50, which extends across the outboard end of the wheel rim 31, as shown in FIG. 3. The outer wheel disc 50 is formed from a metal alloy by a conventional process, such as casting or forging, and is stylized for a particular vehicle line or vehicle trim level. In the preferred embodiment, the outer wheel disc 50 is die cast so that little or no machining is needed to finish the disc 50. The outer wheel disc 40 can be formed from the same or a different metal alloy as used to form the wheel 30.

As shown in FIG. 3, the outer wheel disc 50 includes a central hub portion 51 which is adjacent to the hub 46 of the wheel 30. It will, however, be appreciated that the invention also can be practiced with the outer wheel disc hub 51 axially offset from the wheel hub 46. A central opening 52 and a plurality of apertures 53 (one shown) are formed through the outer wheel disc hub 51. As also shown in FIG. 3, the central opening 52 is aligned with the pilot hole 48 while the apertures 53 are aligned with the wheel lug holes 34. The apertures 53 receive the wheel lugs when the wheel assembly 25 is mounted upon a vehicle. It is contemplated that the apertures 53 and central opening 52 can be covered by a removable trim piece (not shown).

The outer wheel disc 50 includes an annular portion 55 which extends radially from the outer wheel disc hub 51 across the outboard end of the wheel 30 to the outboard tire retaining flange 41. As shown in FIG. 3, a portion of the inboard surface of the annular portion 55 contacts the wheel spokes 47; however, this is optional as the annular portion 55 also can be axially offset from the wheel spokes 47. For simplicity, the annular portion 55 is 50 shown as being generally flat; however, the invention contemplates that the annular portion would include an aesthetic wheel design as determined by stylists. In the preferred embodiment, the annular portion 55 includes a plurality of wheel spokes 56 (one shown) which extend radially from the outer wheel disc hub 51 to a circumferential ring 57 which is adjacent to the outboard tire bead retaining flange 41. It is contemplated that the outer wheel spokes 56 cover the spokes 47 of the universal wheel 30. A balance weight retention flange 58 extends axially from the outer edge of the circumferential ring 57. The flange 58 provides a lip for securing balance weights to the wheel assembly 25.

The present invention contemplates that the outer wheel disc 50 does not provide any structural support to the vehicle upon which the wheel assembly 25 is mounted, but provides only a decorative outboard face for the wheel 30. Accordingly, the outer wheel disc 50 can be formed having a fanciful design and the stylists are not constrained by structural wheel requirements. When a tire is mounted upon the wheel assembly 25, only the stylized wheel outer wheel disc 50 is visible.

In the preferred embodiment, the outer wheel disc 50 is permanently attached with an adhesive to the outboard end of the wheel 30 to form the wheel assembly 25. Alternately, the outer wheel disc 50 can be welded to the outboard end of the wheel 30. In the preferred embodiment, a layer of adhesive 60 is disposed between the circumferential ring 57 of the outer wheel disc 50 and the outboard surface of the outboard tire retaining flange 41. The layer of adhesive 60 can consist of a continuous circumferential bead or a plurality of individual beads spaced equally about the circumference of the outboard flange 41. Because the outer wheel disc 50 does not carry any load, the adhesive need only be sufficient to retain the wheel disc 50 upon the wheel 30. Alternately, a layer of adhesive 61 can be disposed between the outer wheel disc 50 and the wheel spokes 47. Furthermore, a layer of adhesive 62 can be disposed between the outer wheel disc hub 51 and the wheel hub 45. It will be appreciated that the invention can be practiced with any combination of the adhesive layers 60, 61 and 62 and that welds (not shown) can be substituted for any of the adhesive layers.

It is further contemplated that the outer wheel disc 50 is decorated before being attached to the wheel 30. The outer wheel disc can be painted or plated with a decorative layer of metal. In the preferred embodiment, the outer wheel disc 50 is chrome plated. Accordingly, it may be desirable to die cast the outer wheel disc 50 from a metal which is compatible with the chrome plating process, such as an alloy of zinc. It is contemplated that the layer of chrome plating extends over the balance weight retention flange 58. Alternately, the outer wheel disc 50 can be polished and covered by a layer of clear coat. For example, a polished wheel disc cast from an aluminum alloy can be attached to an aluminum alloy wheel.

While the outer wheel disc 50 has been illustrated in FIG. 3 as covering the entire outboard end of the wheel 30, it will be appreciated that the invention also can be practiced with a smaller diameter outer wheel disc. An alternate embodiment 65 of the wheel assembly 25 is illustrated in FIG. 5, where components which are the similar to components shown in FIG. 3 have the same numerical designators.

The wheel assembly 65 includes a universal wheel 66 having a wheel rim 67. The outboard end of the wheel rim 67 is formed as an outboard tire bead retaining flange 68 which has an axially extending lip 69. A stylized outer wheel disc 70 snaps into the lip 69 and is frictionally held thereby. An optional layer of adhesive 71 can be disposed between the outer wheel disc 70 and the outboard tire bead retaining flange 68 to further secure the wheel disc 70 to the wheel 66.

Another embodiment of the wheel assembly is illustrated generally at 75 in FIG. 6. As before, components in FIG. 6 which are similar to components shown in FIGS. 3 through 5 have the same numerical designators. The wheel assembly 75 includes an outer wheel disc 76 mounted upon a universal wheel 77. The outer wheel disc 76 includes at least one pin 78 extending axially from the inboard surface of an outer wheel disc spoke, which, for illustrative purposes, is shown in section in FIG. 6. The pin 78 is received by a corresponding aperture 79 formed through a spoke 80 of the wheel 77, which, for illustrative purposes, is also shown in section. The pin 78 locates the outer wheel disc 76 upon the outboard end of the wheel 77. Alternately, a pin formed upon the wheel spoke 80 (not shown) can be received by a corresponding recess formed in the inboard surface of the outer wheel disc spoke. The invention also contemplates forming a plurality of pins upon the outer wheel disc spokes which are received by a corresponding plurality of apertures formed in the wheel spokes 80.

Alternately, one or more pins can be formed on the hub portion of the wheel disc 76 and extend axially into corresponding recesses formed in the wheel hub 46 (not shown). Similarly, one or more pins can be formed on the circumference of the outer wheel disc 76 and extend axially into corresponding recesses formed in the outboard tire bead retaining flange 41 (not shown).

Figure 7:
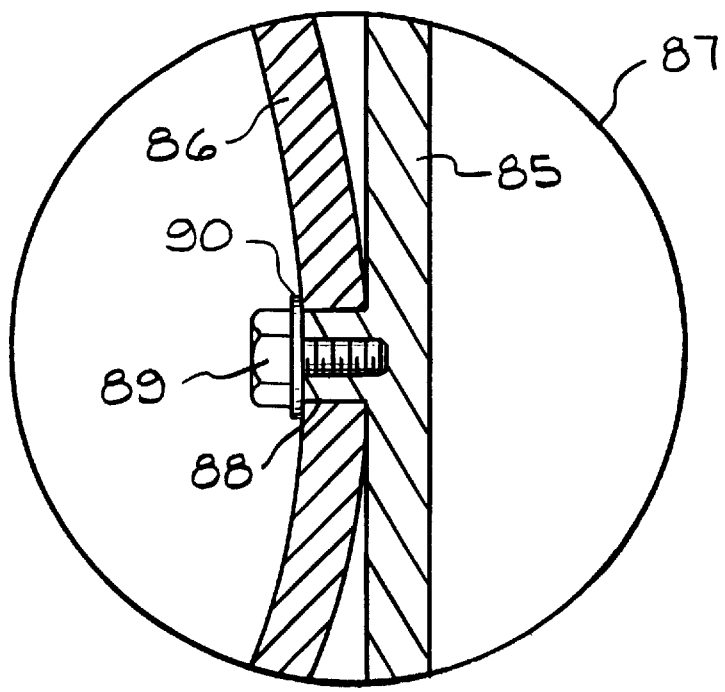
FIG. 7 is an enlarged view of a portion of FIG. 6 which illustrates another alternate embodiment of the wheel assembly.
Figure 8:
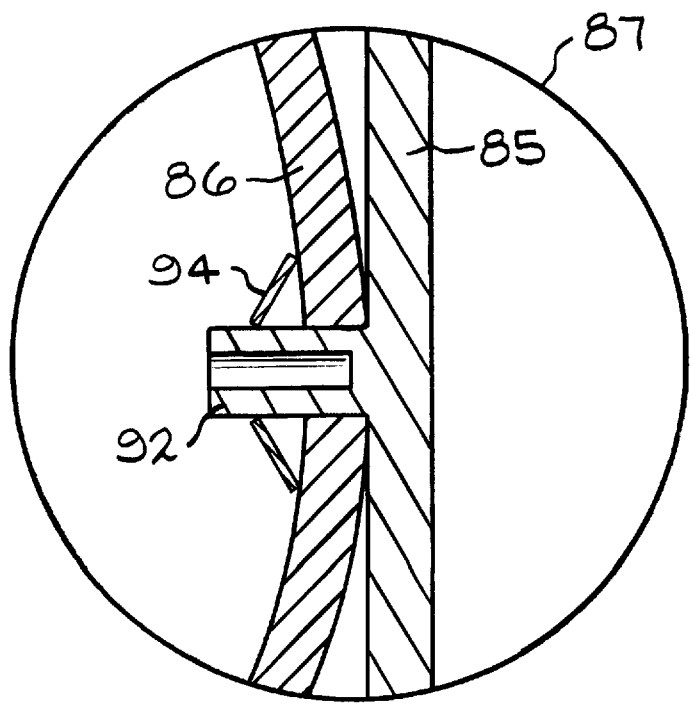
FIG. 8 is an enlarged view of a portion of FIG. 6 which illustrates another alternate embodiment of the wheel assembly.

FIGS. 7 and 8 illustrate alternate methods for fastening an outer wheel disc 85 to a universal wheel 86. For illustrative purposes, the portion of the wheel assembly enclosed by the circle labeled 87 in FIG. 6 is enlarged in FIGS. 7 and 8 to show the alternate methods for attaching a wheel disc 85 a wheel spoke; however, it will be appreciated that the alternate attachment methods may be applied to other portions of the wheel and outer wheel disc, such as, for example, the hub portions. In FIG. 7, a stud 88 formed on the inboard face of the wheel disc 85 extends axially through an aperture formed in the wheel 86. A threaded fastener 89 extends through a washer 90 and into the stud 88 to secure the outer wheel disc 85 to the wheel 86. Similarly, in FIG. 8, a stud 92 formed on the inboard face of the wheel disc 85 extends through a corresponding aperture formed in the wheel 86. A push on type of stud receiver, such as a palnut 94 is pressed onto the stud to secure the outer wheel disc 85 on the wheel 86.

As described above, styling requirements are separated from the structural load bearing requirements for the wheel assembly 25. Accordingly, the present invention contemplates that the wheel 30 would be cast having a "universal" shape which would be used on multiple vehicle platforms. As a result, the per unit cost of the wheel would be reduced due to increased efficiency of production and a reduction in the number of wheel molds required. Additionally wheel validation costs would be reduced since one wheel would be qualified for use on a number of different vehicle platforms. The universal wheel 30 is designed for optimum strength and minimum weight without considering the aesthetic appearance thereof since the visual appearance of the wheel assembly 25 is determined by the styling of the outer wheel disc 50. As shown in FIG. 3, the thick and heavy sidewall of the prior art cast wheel is eliminated. Accordingly, the rim can be made thinner, which results in further weight and cost savings.

As also described above, the outer wheel disc 50 is stylized for a particular vehicle model line and attached to the universal wheel 30 as needed to supply the vehicle manufacturer. Furthermore, different stylized outer wheel discs can be designed as options for the various trim levels of the same vehicle model line and simply attached to the universal wheel as needed. Accordingly, wheel inventories can be reduced. Since the outer wheel disc does not support any vehicle weight, validation is not required for each unique design. It would also be relatively easy to prepare tooling for new wheel designs since only the outer wheel disc would be involved. This reduces both tooling costs and lead times for new wheels.

A plated cast outer wheel disc is less susceptible to heat damage from heat generated by the vehicle brakes. Such heat has been known to warp prior art plastic overlays. When a plated outer wheel disc is attached to a steel wheel, the plated balance weight retention flange provides a pleasing aesthetic appearance. Prior art steel wheels equipped with wheel covers or plated overlays include a balance weight retention flange formed on the outboard end of the wheel rim. Typically, such steel wheels are painted, however, the paint tends to be worn off of the exposed retention flange with usage. Exposure of the base steel results in oxidation forming thereon, which mars the vehicle's appearance. The plated outer wheel disc with the plated balance weight retention flange eliminates this problem.

Figure 9:
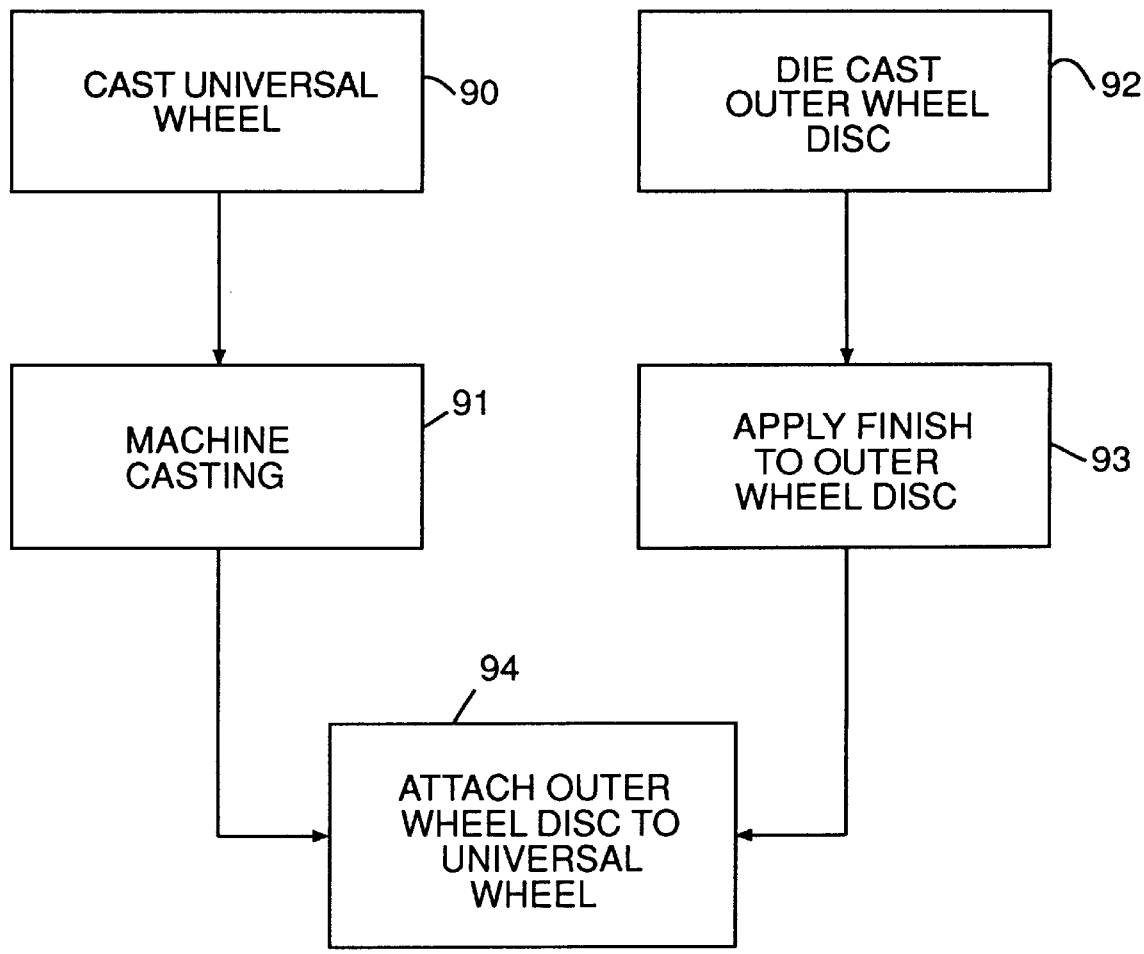
FIG. 9 is a flow chart for a process for manufacturing the wheel assembly shown in FIG. 3.

The present invention also contemplates a process for manufacturing the wheels shown in FIGS. 3 through 8. The process is illustrated by the flow chart shown in FIG. 9. In functional block 90 a one piece universal wheel casting is formed from an alloy of a light weight metal by a conventional process, such as gravity or low pressure casting. In functional block 91, the wheel casting is machined as needed to a final shape. Alternately, a universal wheel can be forged or fabricated by attaching a stamped wheel disc to a rolled wheel rim. Since the outboard end of the wheel will be hidden, the amount of machining required for the casting is minimized. While the wheel casting is being formed, an outer wheel disc is die cast in functional block 92. In the preferred embodiment, the outer wheel disc includes a balance weight retention flange. The outer wheel disc is finished by depositing a layer of chrome plating thereon in functional block 93. Alternately, the outer wheel disc can finished by painting or polishing and clear coating. In functional block 94, the outer wheel disc is attached to the universal wheel to form a completed wheel assembly. In the preferred embodiment, the outer wheel disc is attached with an adhesive; however, the outer wheel disc also can be welded to the universal wheel or secured thereto with a conventional fastener as described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the outer wheel disc has been described as being including a balance weight retention flange; however, it will be appreciated that the balance weight retention flange can be omitted if required for a specific outboard tire bead retaining flange specification.

What is claimed is:

1. A vehicle wheel assembly comprising:
   a one piece vehicle wheel having an annular rim adapted to carry a pneumatic vehicle tire, said rim having an outboard end and an inboard end, said rim including a deep well formed between said outboard and inboard ends, said deep well defining a deep well wall which is adjacent to said outboard end of said wheel rim, said wheel also having a central hub supported within said rim by a plurality of radially extending spokes, said spokes having a generally arcuate shape with one end of each spoke terminating upon said hub and the other end of each spoke terminating on said deep well wall whereby the spoke form a generally radial arch between said hub and said deep well wall and the amount of material included in an outboard wheel sidewall is minimized; and
   a stylized outer wheel disc attached to said outboard end of said wheel.

2. A vehicle wheel assembly according to claim 1 wherein said outer wheel disc is permanently attached to said wheel rim.

3. A vehicle wheel assembly according to claim 2 wherein said outer wheel disc includes a flange formed on the circumference thereof, said flange extending axially from said outer wheel disc.

4. A vehicle wheel assembly according to claim 3 further including a layer of adhesive between said outer wheel disc and said wheel.

5. A vehicle wheel assembly according to claim 3 wherein said wheel spokes are adapted to carry a load of a vehicle and said outer wheel disc carries no load and further including a weld between said outer wheel disc and said wheel.

6. A vehicle wheel assembly according to claim 3 wherein said wheel is a one piece casting formed from an alloy of one of the group consisting of aluminum, magnesium and titanium.

7. A vehicle wheel assembly according to claim 3 wherein said wheel is a one piece forging formed from an alloy of one of the group consisting of aluminum, magnesium and titanium.

8. A vehicle wheel assembly according to claim 3 wherein said wheel is fabricated from steel.

9. A vehicle wheel assembly according to claim 6 wherein said outer wheel cover is die cast from a metal alloy.

10. A vehicle wheel assembly according to claim 3 wherein said outer wheel disc completely covers said outboard end of said wheel.

11. A vehicle wheel assembly according to claim 3 wherein said outer wheel disc is adapted to be attached to a plurality of wheels adapted to be mounted upon different vehicle platforms.

12. A vehicle wheel assembly according to claim 11 wherein said outer wheel disc includes one of a plurality of different aesthetic wheel face designs.

13. A vehicle wheel assembly according to claim 3 wherein said outer wheel disc includes a layer of chrome plate.

14. A vehicle wheel assembly according to claim 3 wherein said outer wheel disc includes a polished surface.

15. A vehicle wheel assembly according to claim 3 wherein said outer wheel disc includes a layer of paint.

16. A vehicle wheel assembly according to claim 3 further including at least one pin formed on an inboard surface of said outer wheel disc, said pin extending axially from said surface and being received in a corresponding recess formed in an outboard surface of said wheel.

17. A vehicle wheel assembly according to claim 3 further including at least one pin formed on an outboard surface of said wheel, said pin extending axially from said surface and being received in a corresponding recess formed in an inboard surface of said outer wheel disc.

18. A process for manufacturing a vehicle wheel comprising the steps of:
   (a) forming a one piece vehicle wheel having an annular rim adapted to carry a pneumatic vehicle tire, said rim having an outboard end and an inboard end, said rim including a deep well formed between said outboard and inboard ends, said deep well defining a deep well wall which is adjacent to said outboard end of said wheel rim, said wheel also having a central hub supported within said rim by a plurality of radially extending spokes, said spokes having a generally arcuate shape with one end of each spoke terminating upon said hub and the other end of each spoke terminating on said deep well wall whereby the spoke form a generally radial arch between said hub and said deep well wall and the amount of material included in an outboard wheel sidewall is minimized;
   (b) forming an outer wheel disc;
   (c) applying a decorative coating to the outer wheel disc; and
   (d) attaching the outer wheel disc to the outboard end of the one piece wheel.

19. A process according to claim 18 wherein in step (a) the wheel is cast and further wherein step (a) includes machining the wheel casting to a final shape.

20. A process according to claim 19 wherein in step (b) the outer wheel disc is die cast from a metal alloy and includes a flange formed on the circumference thereof which extends axially therefrom.

21. A process according to claim 20 wherein in step (c) the outer wheel disc is chrome plated.

22. A process according to claim 21 wherein in step (d) the outer wheel disc is adhesively bonded to the outboard end of the wheel.

23. A process according to claim 21 wherein the wheel formed in step (a) includes wheel spokes which are adapted to carry a load of a vehicle and further wherein in step (d) the outer wheel disc is welded to the outboard end of the wheel with the wheel disc not carrying any load of a vehicle.

24. A process according to claim 18 wherein the wheel cast in formed (a) is adapted to be mounted upon a plurality of different vehicle platforms.

25. A process according to claim 18 wherein the outer wheel disc formed in step (b) is adapted to be attached a plurality of wheels adapted to be mounted upon different vehicle platforms.

26. A process according to claim 25 the outer wheel disc is formed in step (b) having one of a plurality of different aesthetic wheel face designs.

* * * * *